(12) United States Patent
Yatsukevich

(10) Patent No.: US 11,577,167 B1
(45) Date of Patent: Feb. 14, 2023

(54) LOW-LATENCY OCCLUSION MANAGEMENT OF MULTI-LAYER ITEM BOX

(71) Applicant: VIZOR APPS LTD., Limassol (CY)

(72) Inventor: Uladzimir Yatsukevich, Larnaca (CY)

(73) Assignee: VIZOR APPS LTD., Limassol (CY)

( * ) Notice: Subject to any disclaimer, the term of this patent is extended or adjusted under 35 U.S.C. 154(b) by 0 days.

(21) Appl. No.: 17/865,181

(22) Filed: Jul. 14, 2022

(51) Int. Cl.
*A63F 13/52* (2014.01)

(52) U.S. Cl.
CPC .................................... *A63F 13/52* (2014.09)

(58) Field of Classification Search
CPC .......... A63F 13/00; A63F 13/45; A63F 13/46; A63F 13/50; A63F 13/52; A63F 13/58; A63F 13/69; A63F 13/792; G06T 19/00; G06T 15/005
See application file for complete search history.

(56) References Cited

U.S. PATENT DOCUMENTS

| | | | |
|---|---|---|---|
| 6,306,033 B1 * | 10/2001 | Niwa | A63F 13/10 463/31 |
| 8,709,185 B2 | 4/2014 | Hassonjee et al. | |
| 8,961,319 B1 | 2/2015 | Pieron | |
| 9,138,639 B1 | 9/2015 | Ernst | |
| 9,352,217 B1 | 5/2016 | Curtis et al. | |
| 9,626,475 B1 | 4/2017 | Schultz et al. | |
| 9,666,026 B1 | 5/2017 | McLellan et al. | |
| 9,962,605 B1 * | 5/2018 | Wei | A63F 13/50 |
| 11,338,207 B2 * | 5/2022 | Yasuhara | G06F 3/0482 |
| 2009/0186694 A1 | 7/2009 | Gunawardana et al. | |
| 2011/0265041 A1 | 10/2011 | Ganetakos et al. | |
| 2013/0296042 A1 | 11/2013 | Auterio et al. | |
| 2014/0004937 A1 * | 1/2014 | Inagawa | A63F 1/04 463/29 |
| 2014/0066999 A1 | 3/2014 | Carcieri et al. | |
| 2015/0031440 A1 * | 1/2015 | Desanti | A63F 13/822 463/25 |
| 2015/0273320 A1 | 10/2015 | Pieron et al. | |
| 2015/0335995 A1 * | 11/2015 | McLellan | G06Q 30/02 463/25 |
| 2017/0323467 A1 * | 11/2017 | Yan | A63F 13/63 |
| 2018/0093187 A1 * | 4/2018 | Mabuchi | A63F 13/55 |
| 2018/0093188 A1 * | 4/2018 | Mabuchi | A63F 13/60 |
| 2019/0262705 A1 | 8/2019 | Trombetta et al. | |

(Continued)

OTHER PUBLICATIONS

"Virtual currencies, eSports, and social casino gambling"—Position Paper Mar. 2017 United Kingdom Gambling Commission, <extension://efaidnbmnnnibpcajpcglclefindmkaj/https://assets.ctfassets.net/16ev64qyf6l/7jRMC5FrbFkfXKhmN2rajn/f77a0e6dd36f2e8157c4bbaf53dc2eb7/Virtual-currencies-eSports-and-social-casino-gaming.pdf> , pp. 1-17.

(Continued)

*Primary Examiner* — Chase E Leichliter
(74) *Attorney, Agent, or Firm* — Pillsbury Winthrop Shaw Pittman, LLP

(57) ABSTRACT

Provided is a process including: displaying, with a computer system, a multi-layer container to a user, wherein a plurality of items for game play are provided in a plurality of layers of the multi-layer container; and in response to a user input, displaying, with the computer system, the multi-layer container to the user, wherein a top item of the plurality of items for game play has been removed from the multi-layer container.

20 Claims, 12 Drawing Sheets

(56) References Cited

U.S. PATENT DOCUMENTS

| | | | |
|---|---|---|---|
| 2021/0125463 A1* | 4/2021 | Low | G07F 17/3295 |
| 2021/0295655 A1 | 9/2021 | Chan | |
| 2022/0032185 A1* | 2/2022 | Sato | A63F 13/493 |
| 2022/0126208 A1* | 4/2022 | Salakka | A63F 13/67 |
| 2022/0143509 A1* | 5/2022 | Griesemer | A63F 13/60 |

OTHER PUBLICATIONS

Wiltshire, Alex, "Behind the addictive psychology and seductive art of loot boxes," PC Gamer, Sep. 28, 2017, https://www.pcgamer.com/behind-the-addictive-psychology-and-seductive-art-of-loot-boxes/, pp. 1-21.

Larche, Chanel et al., "Rare Loot Box Rewards Trigger Larger Arousal and Reward Responses, and Greater Urge to Open More Loot Boxes," Journal of Gambling Studies, 2021, pp. 141-163, vol. 37, https://link.springer.com/article/10.1007/s10899-019-09913-5.

Internet Archive of "Power, Knowledge, and the Fog of War," retrieved Jan. 27, 2015, Gamechurch.com, https://web.archive.org/web/20150127111130/http:/gamechurch.com/power-knowledge-and-the-fog-of-war/, pp. 1-6.

Magbanua, Luie, "Nintendo Patent Appears to Show Animal Crossing Loot Boxes," Gamerant, Feb. 18, 2022, https://gamerant.com/nintendo-patent-animal-crossing-loot-boxes/#:~:text=Nintendo, pp. 1-13.

Shop Titans_Blueprints retrieved Mar. 26, 2022, https://playshoptitans.com/blueprints, pp. 1-4.

* cited by examiner

LOW-LATENCY OCCLUSION MANAGEMENT OF MULTI-LAYER ITEM BOX

CROSS-REFERENCE TO RELATED APPLICATIONS

No cross-reference is presented at this time.

BACKGROUND

Items which may be used game play are presented to players in virtual games in a number of manners. Items may be located within boxes (or containers) and may be removed from containers and moved or added to a player's cache during play.

SUMMARY

The following is a non-exhaustive listing of some aspects of the present techniques. These and other aspects are described in the following disclosure.

Some aspects include processing of a container to generate a multi-layer container Some aspects include populating of a container to generate a filled multi-layer container.

Some aspects include processing of items to generate masks.

Some aspects include providing of a multi-layer container to a user for interaction.

Some aspects include providing multiple iterations of a multi-layer container based on user interactions.

Some aspects include acquiring items by the user from the multi-layer container.

Some aspects include acquiring items of value by the user from the multi-layer container.

Some aspects include a tangible, non-transitory, machine-readable medium storing instructions that when executed by a data processing apparatus cause the data processing apparatus to perform operations including the above-mentioned application.

Some aspects include a system, including: one or more processors; and memory storing instructions that when executed by the processors cause the processors to effectuate operations of the above-mentioned application.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
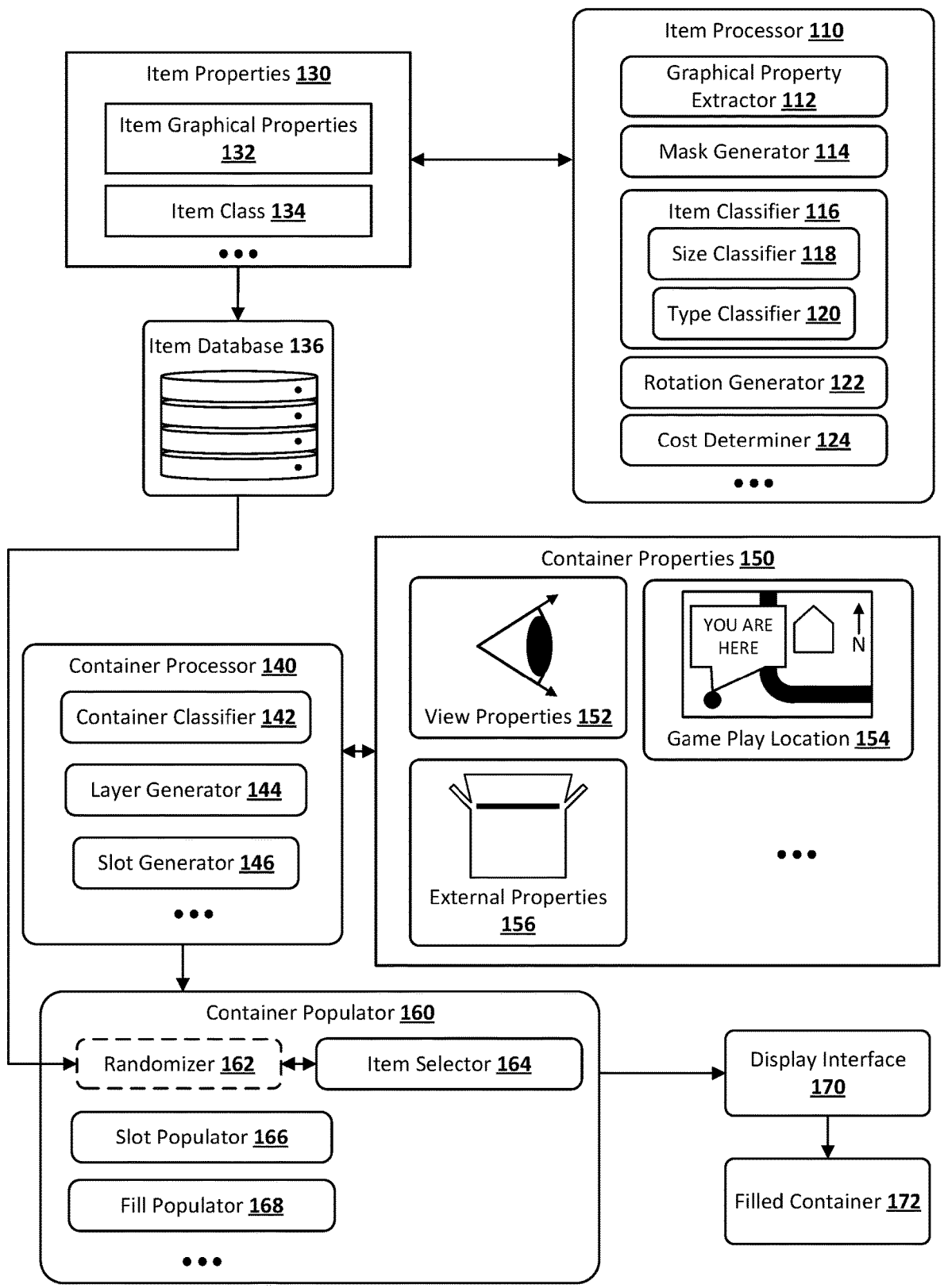
FIG. 1 depicts a system for generating a multi-layer container, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases just as importantly, recognize problems overlooked (or not yet foreseen) by others in the fields of human computer interaction and computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In games played in a virtual environment, which may include video games (played on computing devices such as personal computers, mobile devices, tablet devices, arcade devices, virtual reality simulation devices, etc.), players may acquire items which may be useful in advancing game play. In some games, items may be presented in a "loot box" or other container which a user, where user includes a singular user, user's avatar, user who is part of a group of users, etc., open the container in order to access items contained therein. Items from a container may then be used by the user or added to a user's cache, where cache may represent limited or unlimited item storage ability.

Managing occlusion of stacks of irregularly spaced in-game items is a problem that scales poorly, in terms of computational resources, with the number and variety of such items to be displayed, particularly when certain forms of partial occlusion are desired that give the user a hint of what is lower in the stack, and even more so, when such partial occlusions are engineered to give such hints regarding the identity of multiple items down in the stack. Each such item may be displayed as an image, like a two-dimensional bit-map, like a sprite, and the bounding contour of each item may be different. Determining how to position such items, based on their depth in a z-buffer, such that higher items only partially occlude some items below (and in some cases, such that items below a threshold depth are fully occluded) is challenging and may, in some approaches, entail computing the intersection of sets of pixels based on x and y positions that are at least partially randomized to determine occlusions, which is a resource intensive operation that may need to be repeated many times to determine how to configure items in a stack to obtain the desired occlusions as a user moves through the stack, removing items, and having the appropriate hints of what lies below to implement the game designer's intent.

In some games, a "loot box" may represent a purchasable item—where a purchase may be made in an in-game currency (such as experience points, reward points, coins, gems, in game fiat currency, etc.) or where a purchase may be made in a real world currency (e.g., US dollars, Canadian dollars, bit coin, etc.) or based on an in game currency which may be obtained by transaction involving a real world currency. Purchasable loot boxes may be one was of monetizing a game. Games which are "free-to-play" or which operate as "games-as-a-service" may allow purchase of loot boxes which generate revenue. Game which are not free to play or which do not operate as a service may also allow purchase of loot boxes to enhance play, which may also generate revenue. Alternatively, or in addition, loot boxes may be distributed as locked (or otherwise unopenable containers) which may be opened with a key, where keys may be available for purchase.

A loot box may contain items, which may be consumable items for game play (such as weapons, projectiles for weapons, food, wearable items, etc.). Consumables may include items which are consumed, such as food items, items which wear out, such as swords, items which have limited lifetimes, such as limited-time relevant avatar apparel, items which may be held or used indefinitely, such as permanent upgrades to a weapon or avatar, etc.

A loot box may contain a random, semi-random, apparently random (e.g., appears random to a user but does not operate on random principles) (the term "random" as used herein includes pseudo-random values), or otherwise selected item or group of items. The item or group of items within a loot box may be constrained by in-game rules, which may or may not be apparent to users. For example, a loot box available for a particular price level may be advertised as guaranteed to include at least one item of a particular value (where value may be monetary value, rarity, boost level, etc.). Loot box prices may correspond to guarantees about their contents. A loot box may contain a group of items where each item corresponds to a different type of item (e.g., each item comes from a different class of items, such as a weapon, a projectile for use in a weapon, a piece of armor, a cosmetic appearance item, etc.), where the types of items supplied may be the same but the particular item supplied may vary. A loot box may contain a group of items which may include multiple items from one or more type of item—for example, a loot box may include five different weapons where one weapon is rare, one weapon is less rare, and three weapons are common. The randomness of the items in a group of items may also vary, where some items of a group of items may be non-random while other items may have different levels of randomness.

Loot boxes may be opened upon purchase, or purchase of a key, and may display all the items contained therein—either simultaneously or in a sequence. Loot boxes may disgorge all items contained within when opened. Loot boxes may display items which are possibly within the loot box before purchase, and then identify the specific items within the loot box after purchase, or allow other types of preview before purchase of a specific loot box or key.

In some embodiments, a multi-layer container for items is provided. The multi-layer container may be a loot box, analogous to a loot box, or another container which contains items which may be used in gameplay or in real-world applications (such as a certificate for another game or item outside of the game). In some embodiments, items in a multi-layer container have a spatial or temporal relationship to one another, such that a second item may be accessible only after a first item is removed or after a period of time has passed since a first item has been removed. In some embodiments, multi-layer containers increase the number of interactions between a user and a container, which may be important in game play. In some embodiments, multi-layer containers increase the time of interaction between a user and a container, which may be important in game play.

In some embodiments, multi-layer containers may be of different external appearances, such as boxes, trunks, chest, coolers, etc. In some embodiments, the external appearance of the multi-layer container may be incorporated into or reflective of surrounding terrain in-game. In some embodiments, multi-layer containers may have a first appearance before a user has interacted with them (e.g., a closed state) and a difference appearance after a user has interacted with them (e.g., an open state). In some embodiments, an open state may include visual representation of items in the multi-layer container—including items available to acquire and items which are not currently available to acquire. In some embodiments, a multi-layer container may return to a closed state appearance if the user has not interacted with the container for a period of time. In some embodiments, a multi-layer container may stay in an open state after a user has interacted with it. User interactions may include approaching (e.g., a bookshelf), opening (e.g., a box), tapping (e.g., a trunk), carrying or picking up (e.g., a basked), knocking (e.g., on a door) etc. and may depend on surrounding terrain, container size, etc. In some embodiments, a multi-layer container may be hidden or obscured, such as within another container or multi-layer container.

In some embodiments, an item within a multi-layer container may obscure another item within the multi-layer container. In some embodiments, filler may be provided between items in a multi-layer container. In some embodiments, filler may obscure an item within a multi-layer container.

In some embodiments, a multi-layer container may have a most accessible item, where the most accessible item may be the most visible item (e.g., less obscured than other items), the item available for acquisition by a user, or group of items available for acquisition by the user, etc. In some embodiments, the multi-layer container may have a two-dimensional or three-dimensional appearance. In some embodiments, the items within the multi-layer container may have two-dimensional appearance, three-dimensional appearance, or a combination thereof. The container may be displayed or viewed from one or more viewing angle. The most visible item may be the same from each viewing angle, vary by viewing angle, etc. In some embodiments, a multi-layer container may be shaken or otherwise moved, which may or may not change the order of items in the multi-layer container.

In some embodiments, items in a multi-layer container may be removed in order to view or access items lower than the removed items. For example, items may be removed and moved to a user's cache or used for game play. In some embodiments, removing an item may require or otherwise "cost" an amount in an in-game or other currency. In some embodiments, a user may shake (e.g., cause items in a multi-layer container to be rearranged) for an amount in an in-game or other currency.

In some embodiments, items in a multi-layer container are arranged in a virtual three-dimensional structure, which may be viewed as a projection in two-dimensions. In some embodiments, items in a multi-layer container are arranged in a two-dimensional structure, which may mimic a perspective view of a three-dimensional structure. In some embodiments, the multi-layer container may be comprised of multiple layers (like in a z-buffer) which are arranged in a top-to-bottom orientation. In some embodiments, items occupy the multiple layers, and in some cases, each item may have an x and y position (e.g., in pixel space, like in terms of horizontal and vertical pixels in a Cartesian coordinate system) that, along with the position in the z-buffer, and bounding contour (e.g., outline, in pixel space) of each item, determines which parts of the item are occluded by those items higher in the stack. In some embodiments, items within the multi-layer box may include items for game play and filler items. In some embodiments, filler appearance depends on container properties (e.g., container location, container size, container type, etc.). In some embodiments, filler appearance depends on item properties (e.g., item type, item size, etc.). In some embodiments, filler may be associated with a specific item (e.g., wrapping a specific item, near a specific item, etc.). In some embodiments, filler may be removed by a user. In some embodiments, filler may be removed when a user removed an item for game play proximate to the filler.

In some embodiments, a user may remove some items from a multi-layer container in the course of game play. In some embodiments, a user may remove substantially all items from a multi-layer container in the course of game play, such as to continue to advance in game play. In some embodiments, it may cost a user an in-game currency to remove an item from a multi-layer container. In some embodiments, an item removed from a multi-layer container may be converted into in-game currency (e.g., an in-game currency which is spent to remove the item from the multi-layer container or a different in-game currency) in the course of game play.

In some embodiments, each layer of the multi-layer container contains only one item. In some embodiments, a layer of the multi-layer container may container more than one item. In some embodiments, a user may acquire only one item. In some embodiments, a user may acquire more than one item, including where acquiring additional items may increase the cost to acquire items. In some embodiments, an in-game currency, which may be an energy currency, is required to acquire an item. In some embodiments, a user may know the cost, value, or combination thereof of substantially all items in a multi-layer container. In some embodiments, a user may know the cost, value, or combination thereof of visible items in a multi-layer container.

In some embodiments, a layer may be a mask, where a mask may be a layer which has a size, shape, or combination thereof, which corresponds to the item or an appearance of the item. In some embodiments, parts of the visual representation which correspond to a mask for an item are areas of the visual representation which may be used to interact with the item, while areas outside of the mask may not allow interaction with the item or may allow interaction with other items. In some embodiments, a mask may be a property of an item. In some embodiments, a mask size or location may be determined based on properties of a container.

FIG. 1 depicts a system for generating a multi-layer container. FIG. 1 depicts an item processor 110, a container processor 140, and a container populator 160. The components depicted in FIG. 1 are provided for ease of description and more or fewer components and systems may be implemented.

The item processor 110 operates on an item which is to be displayed in a multi-layer container or which is an element of a group of items where a subset of the group of items may be displayed in a multi-layer container. The item processor 110 may contain a graphical property extractor 112, which may identify the shape, size, outline, etc. of a graphical representation of the time. The item processor 110 may contain a mask generator 114, which may generate a mask based on the graphical properties of the item. The item processor 110 may contain an item classifier 116, which may classify the item. The item classifier 116 may include one or more types of classification, including a size classifier 118, a type classifier 120 (e.g., which may be a categorizer such one which classifies an item by use case, such as food, clothing, etc., one which classifies an item by value, such as valuable, less valuable, etc.), or other types of classifiers.

The item processor 110 may include a rotation generator 122. The rotation generator 122 may determine a point about which the object can be rotated (e.g., "rotation point"), which is a point corresponding to an axis of rotation. The rotation point can correspond to a pixel of the item, such as a pixel of the graphical representation of the item and/or a pixel corresponding to the mask of the item. The rotation point may be identified based on x and y axes. The rotation point may also have a z-axis component. The rotation generator 122 may also determine zero rotation orientation of the item. The zero rotation orientation of the item may correspond to an initial orientation of the item, such as corresponding to the graphical representation as acquired by the item processor 110, or may correspond to a selected orientation of the item (such as an orientation where the item or text on the item is approximately upright). An angle of rotation may be determined based on a difference between the zero rotation orientation of the item and a rotated item. The point of rotation may be a point about which the item may be rotated when it is populated into the multi-layer container. The point of rotation may be a point about which the item may be rotated in a video sequence, such as a video sequence which may occur when the item is selected, removed from the multi-layer container, etc. The point of rotation may be selected massed on a center of mass, weighted average, moment of inertia, etc. The rotation generator 122 may select multiple rotation points, which may be associated with different types of rotation—for example a first rotation point associated with rotation during population of a multi-layer container and a second rotation point associated with rotation during animated sequences. In some embodiments, a rotation point may be used for multiple rotation types (e.g., both static rotation and animated rotation). The rotation point may also be used for movement during an animation other than rotation (e.g., translation, flipping, etc.). An angle of rotation may be in plane (e.g., in the x-y plane of the display) or out of plane (e.g., have a nonzero z-direction component out of the plane of the display).

The rotation generator 122 may also determine a direction and/or magnitude of rotation. For example, the rotation about the rotation point when filling the multi-layer container may be rotation in the x-y plane smaller than a threshold rotation—such as less than 30 degrees. The rotation threshold may vary for different items and may be determined based on the item's characteristics. In some embodiments, items which include text, such as a book spine, may be limited to appearing substantially vertically, for example with an angle of rotation of plus or minus 15 degrees, and substantially horizontally, for example with an angle of rotation of 90 degrees plus or minus 15 degrees. The items with include text may be prohibited from appearing horizontally, for example with an angle of rotation of 270 degrees. Other items, for example a fishbowl containing liquid, may also be limited in angle of rotation such that the depiction of such an item does not appear nonsensical (e.g., rotated such that the liquid would spill).

In some embodiments, items may experience translation, flipping, resizing, and/or other movements with or without experiencing rotation. Movement may be applied to the item based on the point of rotation. For example, the point of rotation may be used as a zero point or origin point for transforms or other movement functions. In some embodiments, item rotation and other movements may be provided one or more transforms. The transforms may operate on pixels of the item individually or the item as a whole. The transforms may be linear transforms, geometrical transforms, angular transforms, etc. One or more basic linear algebra subprogram (BLAS) may be used to provide one or more transforms. The transforms may be pre-computed, for example and stored on a computer. In some embodiments, the transforms may be determined individually and/or in real time for an item selected by a user or for an item provided to a multi-layer container. Animation sequences may be pre-computed or determined individually. Animation sequences, such as for removing an item from the multi-layer container, may be precomputed for an item, computed as items are selected for the multi-layer container, or may be computed when the item is selected.

The item processor 110 may include a cost determiner 124, which may determine a first cost for acquiring an item (e.g., in a first in-game currency), a second cost for disposing of an item (e.g., a value in the first in-game currency or in a second in-game currency), or a combination thereof. The item processor 110 may operate on individual items, batches of items, substantially all items. The item processor 110 may output item properties 130, which may be associated with an item, such as by storage tagging or other notation in items for which properties are stored in an item database 136. Item properties 130 may include item graphical properties 132, which may include mask properties, item class 134, or other item information.

The container processor 140 operates on a container which is to be displayed during game play. The container processor 140 may contain a container classifier 142, a layer generator 144, a slot generator 146, etc. The container processor 140 may operate upon or identify container properties 150. The container properties 150 may include view properties 152, e.g., angle of view, game play location properties 154, e.g., game play location, type of location, function in story, etc., external properties 156, e.g., size, shape, etc. The container processor 140 may identify container properties 150, such as by extracting container properties from graphical representation of a container. The container processor 140 may also or instead store container properties 150 or read container properties 150 from stored container information.

The container classifier 142 may classify the container by type, by size, by location, by purpose (e.g., in gameplay). The container classifier 142 may determine a type of filler based on container classification. For example, a car trunk may not have any filler, while a moving box may have packing peanut filler.

The layer generator 144 may determine how many layers a container contains. The number of layers may be determined based on the container size, number of items contained in the container, etc. The number of layers may or may not correspond to a real word number of items which would fit in an analogous container. For example, a small container may container many layers or many items, even enough layers or items to appear comical or unrealistic. The layer generator 144 may determine a size and shape for layers of the container. The layers may have the same size and shape, or may be different. The layer generator 144 may generate layers which are larger than the container when viewed from a specific view—e.g., the container or contents of the container may expand when opened. The layer generator 144 may determine a perspective for a layer or for the container as a whole.

A variety of techniques may be used to mitigate some of the issues discussed above with respect to engineering the desired occlusion of items a stack. In some cases, this may depend on the region of pixel space reserved by a container, which may be selected, for instance randomly, from a set of containers in a game (like boxes, treasure chests, etc.), and in some cases, the container may have an interior portion (like the inside of a treasure chest) that is placed at or near a bottom of portion of a z-buffer used for a stack and an outer portion (like an edge and lid of the treasure chest) that is placed near or at a top portion of such a stack. In some cases, items in the box may be placed between these positions by the slot generator 146, described below.

The slot generator 146 may determine a slot (e.g., a position) within a layer for an item. The slot generator 146 may determine slots such that items, when placed in the slots, overlap fully, overlap partially, do not overlap, or a combination thereof. The slot generator 146 may determine a classification for a slot—that is a classification for an item to be inserted into the slot. The slot generator 146 may determine a size classification (e.g., a size of an item, a size of a mask corresponding to the item, etc.), a type classification, a cost classification, a value classification, etc.

The container populator 160 may fill a container. The container populator 160 may fill a container once, such that each user experiences the same items in a multi-layer container. The container populator 160 may instead fill a container for a user, for each instance of a container, when requested by gameplay, etc. The container populator 160 may store a filled container or may be called upon to provide a filled container as required by gameplay, such as when a container is opened by a user. The container populator 160 may access items from the item database 136 via an item selector 164, optionally through a randomizer 162. The items acquired by the item selector 164 may be assigned to slots by a slot populator 166. A fill populator 168 may then generate or provide fill to fill spaces between items or slots. The fill populator 168 may acquire fill from a library of fill pieces or generate fill based on graphical relationships between items or slots. A display interface 170 may then display a filled container 172 based on properties determined by the container populator 160. Items may be selected from a set of candidate items, e.g., more than 10, more than 100, more than 1,000, or more than 10,000, in some cases, with probability distributions that vary by items, such that some items are more rare.

In some embodiments, slots may specify x, y, and z positions (with x and y being in pixel space, and z being an integer value in a z-buffer), and a container or slot-set may have a collection of such positions. In some cases, these positions may be associated with items that have bit-maps have certain types of contours or sizes that afford the desired occlusion of items lower in the stack. In some cases, these slots may be configured in advance and stored in memory of a game, e.g., manually, which is expected to substantially reduce the computing load and latency associated with determining how to configure containers to give the desired occlusions (and associated hints of what lies below) as a user removes items and moves down the stack.

In some embodiments, there may be more items and containers than is feasible to pre-compute or otherwise pre-determine slots to obtain the desired occlusions that give the desired hints but also delay revealing when certain lower items are in the container to keep the player engaged and motivated to find out what resides lower in the container. Some embodiments may determine slot configurations with a greedy optimization algorithm that moves up the stack, determining x and y positions for each slot for each layer of the z-buffer that have occlusions that score well according to an occlusion metric. The occlusion metric, in some cases, may depend on whether items more than a threshold number of layers below are fully occluded and whether items less than a threshold number of layers below are occluded by less than some threshold amount, like more than 15% of the lower item's pixels are un-occluded and greater than 50% of the lower item's pixels are occluded by the candidate position. In some cases, these occlusions may be computed with a convolution, like a convolutional kernel, that outputs a score corresponding to such a metric, and the slot's x and y positions may be set to the largest value of the convolution over the space of candidate positions. In some cases, the convolution may have a stride that is several pixels to expedite operations. Some embodiments may train a machine learning algorithm, like a convolutional neural network or vision transformer, to determine positions that optimize an occlusion metric. In some cases, the occlusion metric may be a differentiable equation that supports approaches like gradient descent for compute-efficient optimizations.

Figure 2:
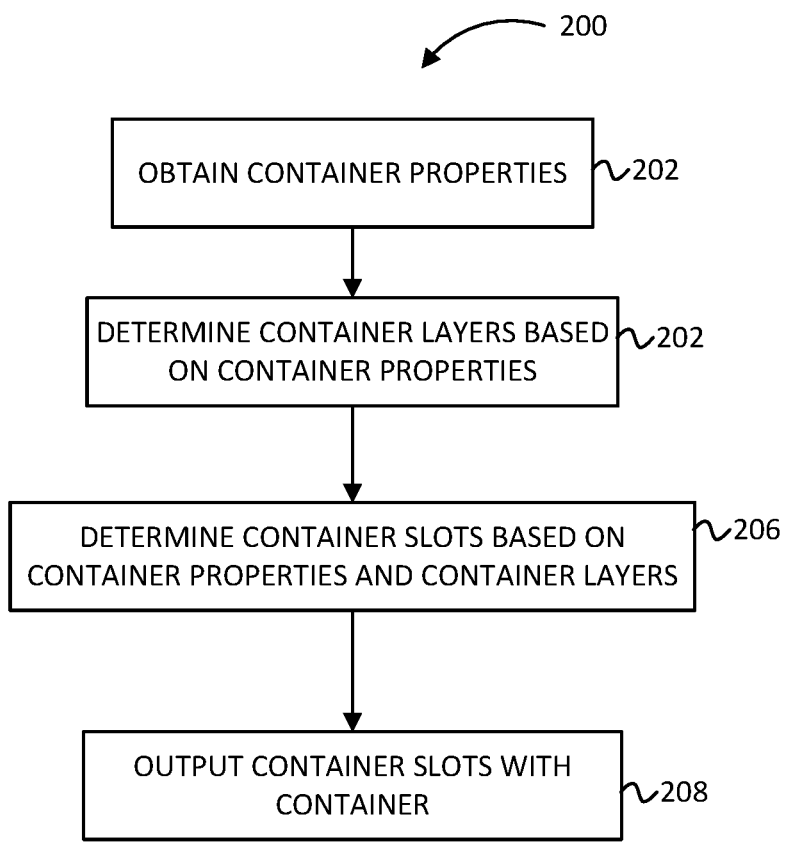
FIG. 2 illustrates an exemplary method of generating a multi-layer container, in accordance with some embodiments.

FIG. 2 illustrates an exemplary method 200 of generating a multi-layer container. Each of these operations is described in detail below. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting. In some embodiments, one or more portions of method 200 may be implemented (e.g., by simulation, modeling, etc.) in one or more processing devices (e.g., one or more processors). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200, for example. For illustrative purposes, optional operations are depicted with dashed lines. However, operations which are shown with unbroken lines may also be optional or can be omitted, which is not to suggest that other items are required, as even the solid line items may be omitted in some embodiments focusing on other aspects.

At an operation 202, container properties are obtained. The container may be a single container, a group of substantially similar containers, a family of containers, etc. The container may be a visual representation of a container, in two-dimensions, in three-dimensions, etc. The container may include a time lapse representation of a container, such as a panoramic view, rotational view (e.g., 360-degree rotation), views from multiple perspectives, etc. The container properties may include properties of a closed container (e.g., a container before it has been interacted with by a user) and properties of an opened container (e.g., a container which may display one or more item within). The container properties may include information about external properties of the container (e.g., external properties 156 of FIG. 1), which may include container size (including one or more container dimension), container type, container appearance. External properties of the container may be measured in pixel or other graphical representation size. External properties of the container may instead or in addition be measured in real world equivalency sizes (e.g., where a moving box, for example, may be a 3' by 3' by 3' container). Container may be of a consistent scale with other game play objects, or may be of a larger or smaller than other game play objects. For example, a container may be larger than surrounding objects when opened. The container properties may include information about the appearance of the container when provided to a user (e.g., view properties 152 of FIG. 1), which may include view angle, information about perspective, etc. View properties may include transforms or other operations which may alter the container to be viewed from more than one perspective. The container properties may include information about the container with respect to the game play or story line (for example, game play location properties 154 of FIG. 1). The container properties may include one or more container classification, such as a plot classification (e.g., container for weapons, container for food, etc.), a size classification (e.g., small container, large container, etc.), a type or purpose classification (e.g., car trunk type container, moving box type container, etc.). Other container properties may be obtained.

At an operation 202, a number of layers are determined based on the container properties. A number of layers may be determined as a batch—such as five layers for a first container. The number of layers may instead be determined iteratively or sequentially, such as a after four layers have been provided it may be determined in the container may support a fifth layer or not. The number of layers for a container may be determined on container size, a number of items to be contained in the multi-layer container, a size of item to be contained in the multi-layer container, a plot device, or a combination thereof. The number of layers of a multi-layer container may be determined based on the container properties and adjusted as items are placed in layers. The number of layers for a container may comprise a layer which contain fill, which may or may not also contain items. The number of layers for a container may comprises a layer which contains neither fill nor an item. The number of layers for a container may be a predetermined number for all containers, a predetermined number based on container size, a predetermined number based on plotline, etc.

The layers may be substantially the same size as the container, substantially the same size as a space representing the opening of the container, smaller than the container size, etc. The layers may have an order, such as from top to bottom. The layer order may be defined by an axis within the container (for example a z axis out of the x-y plane). The layer order may be defined by a graphical overlay order (for example, a front layer, a back layer, etc.). The layer order may be relational—for example one layer may be ordered based on its relationship to a top layer or bottom layer or with relation to the graphical representation of the container.

At an operation 206, a number of slots are determined for a layer based on container properties and container layers. A slot may be an area of a layer which is to be filled with an item. A layer may comprise one or more slots. A layer may comprise a slot for an item and one or more slots for fill. A slot within a layer may be determined based on the layer alone or determined based on positions of slots in other layers of the multi-layer container. For example, slots which correspond to item locations may be determined such that when items are inserted, items in lower layers will be partially obscured by items in upper layers. A slot in a top layer may be selected based on a perspective view of the container, where the slot in the top layer may be the most prominent location when the multi-layer container is viewed from a given perspective. Slots may be selected based on a view of the multi-layer container and then assigned to corresponding layers. In some embodiments, a visually pleasing arrangement of items may be created and then locations of the items may be assigned to slots and layers, such that the multi-layer container may be repopulated with other items.

At an operation 208, the multi-layer container with its corresponding layers and slots may be output. The multi-layer container may be output to a visual display for user interaction. The multi-layer container may be output to storage, such that it may be retrieved from storage to be populated with items during game play.

As described above, method 200 (and/or the other methods and systems described herein) is configured to provide a generic framework for generation of a multi-layer container.

Figure 3:
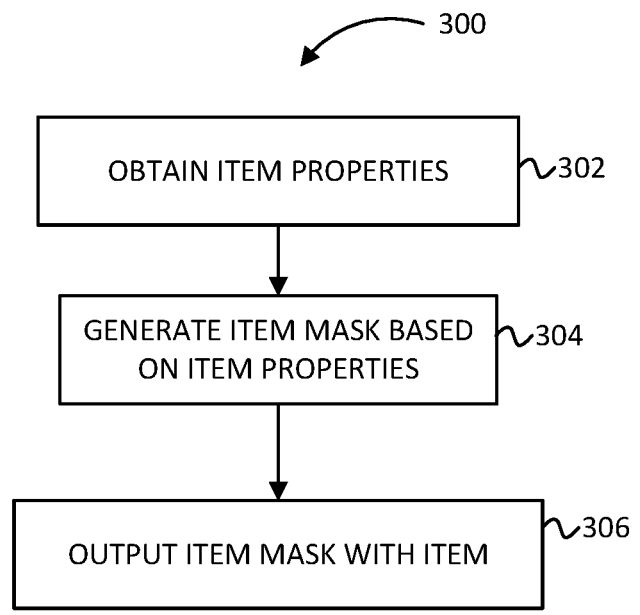
FIG. 3 illustrates an exemplary method for processing an item for populating a multi-layer container, in accordance with some embodiments.

FIG. 3 illustrates an exemplary method 300 for processing an item for populating a multi-layer container. Each of these operations is described in detail below. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting. In some embodiments, one or more portions of method 300 may be implemented (e.g., by simulation, modeling, etc.) in one or more processing devices (e.g., one or more processors). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300, for example. For illustrative purposes, optional operations are depicted with dashed lines. However, operations which are shown with unbroken lines can also be optional or can be omitted.

At an operation 302, item properties are obtained. The item may be a single item, a group of substantially similar items, a family of items, etc. The item may be a visual representation of an item, in two-dimensions or three-dimensions. The item may include multiple views of the item, for example at different resolutions, in different sizes, from different perspectives, etc. The item properties may include information about graphical properties of the item (e.g., item graphical properties 132 of FIG. 1), which may include item size, item shape, item outline, item pixels, item color, etc. The item properties may be properties of vector images. The item properties may be properties of raster images. The item properties may include a size scale, where an item may be scalable. The item properties may include classifications of the item (e.g., item class 134 of FIG. 1). Items may be classified in multiple ways, where classification may then include multiple class identifies, such as size (e.g., large item, small item, etc.), use (e.g., food, weapon, etc.), corresponding location (e.g., pantry, car trunk, mountain hideaway, etc.), value (e.g., in in-game currency, in value in game play, etc.), rarity (e.g., a rare item, a common item), etc. Classifications may include location of game play to which an item corresponds. Classifications may include plot points (e.g., storylines) to which an item corresponds. Classifications may be string values, text values, probabilities, percentages, numerical values, etc. Classifications may be processed to provide numerical values for classifications, such as by assigning corresponding probabilities to various classifications, such that items may be replaced with similar items or items selected from a group of similar items for a multi-layer container.

At an operation 304, a mask is generated for the item based on the item properties. In some embodiments, a mask is generated based on graphical properties and not classifications. However, in other embodiments, classifications may influence mask generation, such as mask size, mask shape, etc. For example, items classified as large may have masks of a similar size, while large items may have varying mask shapes.

A mask may be generated based on the item's graphical appearance. The mask may be contiguous with the outline of the item—a mask may correspond substantially to the pixels of the item. The mask may be larger or smaller than the pixels of the item. For example, a mask may be larger than the item by a border of three pixels.

At an operation 306, the item with its corresponding mask may be output. The item may be output to a visual display for user interaction. The item may be output to storage, such that it may be retrieved from storage to populate a multi-layer container during game play.

As described above, method 300 (and/or the other methods and systems described herein) is configured to provide a generic framework for processing an item for populating a multi-layer container.

Figure 4:
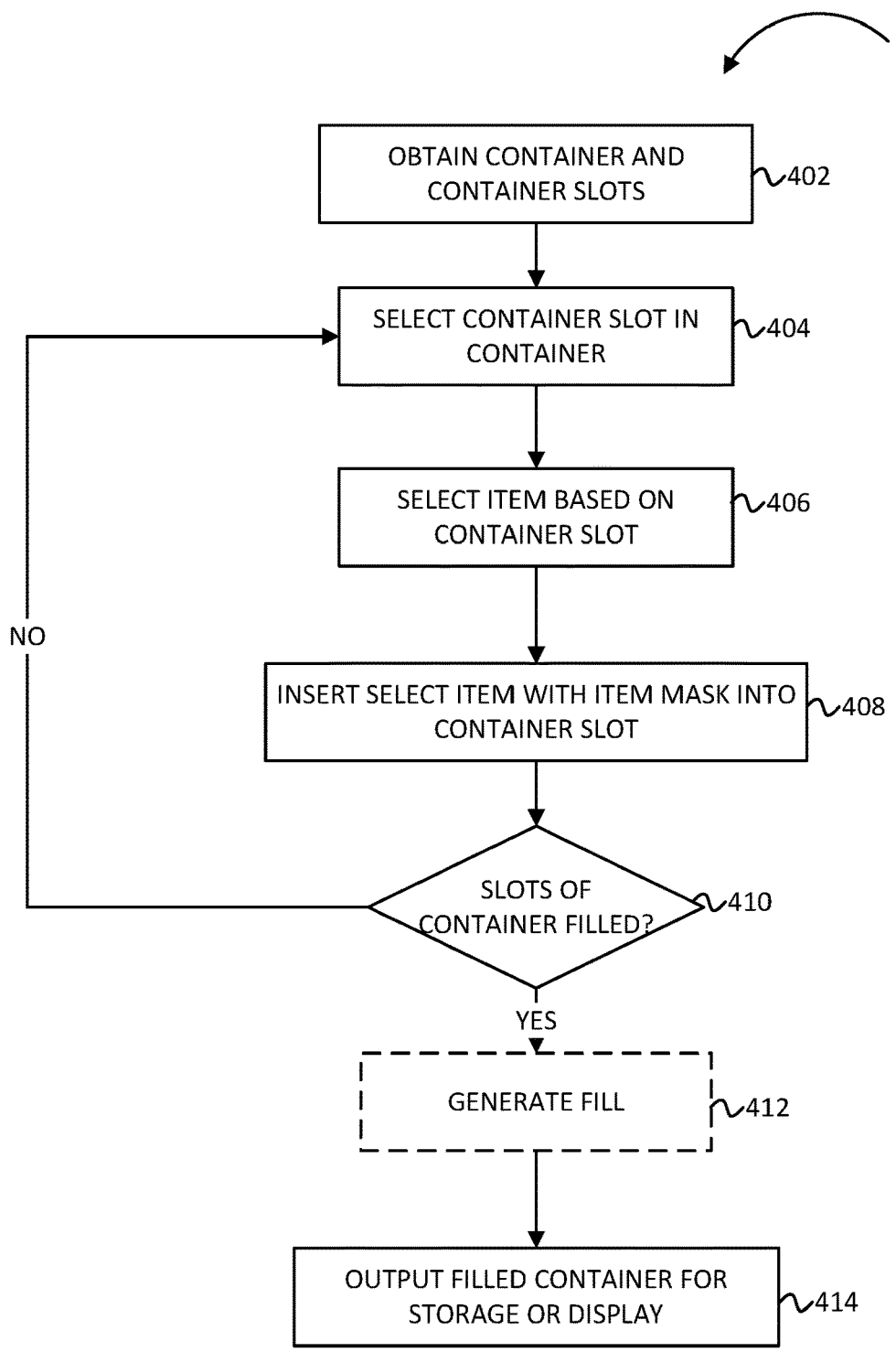
FIG. 4 illustrates an exemplary method for populating a multi-layer container, in accordance with some embodiments.

FIG. 4 illustrates an exemplary method 400 for populating a multi-layer container. Each of these operations is described in detail below. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting. In some embodiments, one or more portions of method 400 may be implemented (e.g., by simulation, modeling, etc.) in one or more processing devices (e.g., one or more processors). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 200, for example. For illustrative purposes, optional operations are depicted with dashed lines. However, operations which are shown with unbroken lines can also be optional or can be omitted.

At an operation 402, a container in obtained. The container may be obtained together with layers and slots or may be processed to provide layers and slots as previously described in reference to FIG. 2. The container may be obtained from storage.

At an operation 404, a slot of the container is selected. The slot may be selected in order, e.g., as the topmost unfilled slot, as the bottom most unfilled slot, etc. The slot may be randomly selected from the unfilled slots. The slot may be selected based on a relationship to other filled or unfilled slots from a perspective view. The relationship between slots from a perspective view (e.g., which slots appear closest to a view) and the relationship between slots in layers (e.g., which slots correspond to layer which are above or below other slots in other layers) may be different or the same.

At an operation 406, an item is selected based on the container slot. The item may be selected based on properties of the container or container slot, such as a classification. The item may be selected based on a property of the item, such as a graphical property including size, shape, etc. The item may be selected based on a probability, such that an item may be displayed with a frequency corresponding to a predetermined rarity, to a value, etc.

At an operation 408, the selected item is inserted into the selected slot of the container. The item can be inserted graphically. The item may be inserted into the layer of the container at the position of the selected slot. A slot which has had an item inserted may be considered "filled". The item may be associated with a position in the container (e.g., in the x-y plane) and a position in a layer (e.g., in a top to bottom relationship) such that the container can be displayed with the item in the selected At an operation 410, it is determined if the slots of the container are filled. If the slots of the container are not filled, flow continues to the operation 404 where another slot is selected from the container. It may be determined if the slots of the container are substantially filled, or filled to a threshold. In some embodiments, it may be determined that all of the slots of the container are filled. In some embodiments, it may be determined that a certain number of items have been inserted in the multi-layer container. In some embodiments, empty slots may be filled with fill or otherwise left unoccupied by items in some instances.

If the slots are filled, at an operation 412 fill is optionally generated. Fill material can be selected based on container properties, item properties, or a combination thereof. Fill can correspond to items which appear between items but which are not items for game play. For example, fill can be a visual representation corresponding to packing peanuts, wrapping paper, moving blankets, Styrofoam, newspaper fill, etc. Fill can also be empty space, such that a bottom of the container is visible between items. In some instances, fill can be a restraining device, such as netting (e.g., cargo netting) or support (such as shelves or other dividers).

At an operation 414, the filled multi-layer container is output for storage or display. The filled multi-layer container can be displayed to a user via a display interface. The filled multi-layer container can be stored, together with layers, for later display. A filled multi-layer container can be generated per user or per incidence during game play. A filled multi-layer container may be stored and output to multiple users or at multiple location in game play.

As described above, method 400 (and/or the other methods and systems described herein) is configured to provide a generic framework for populating a multi-layer container.

Figure 5:
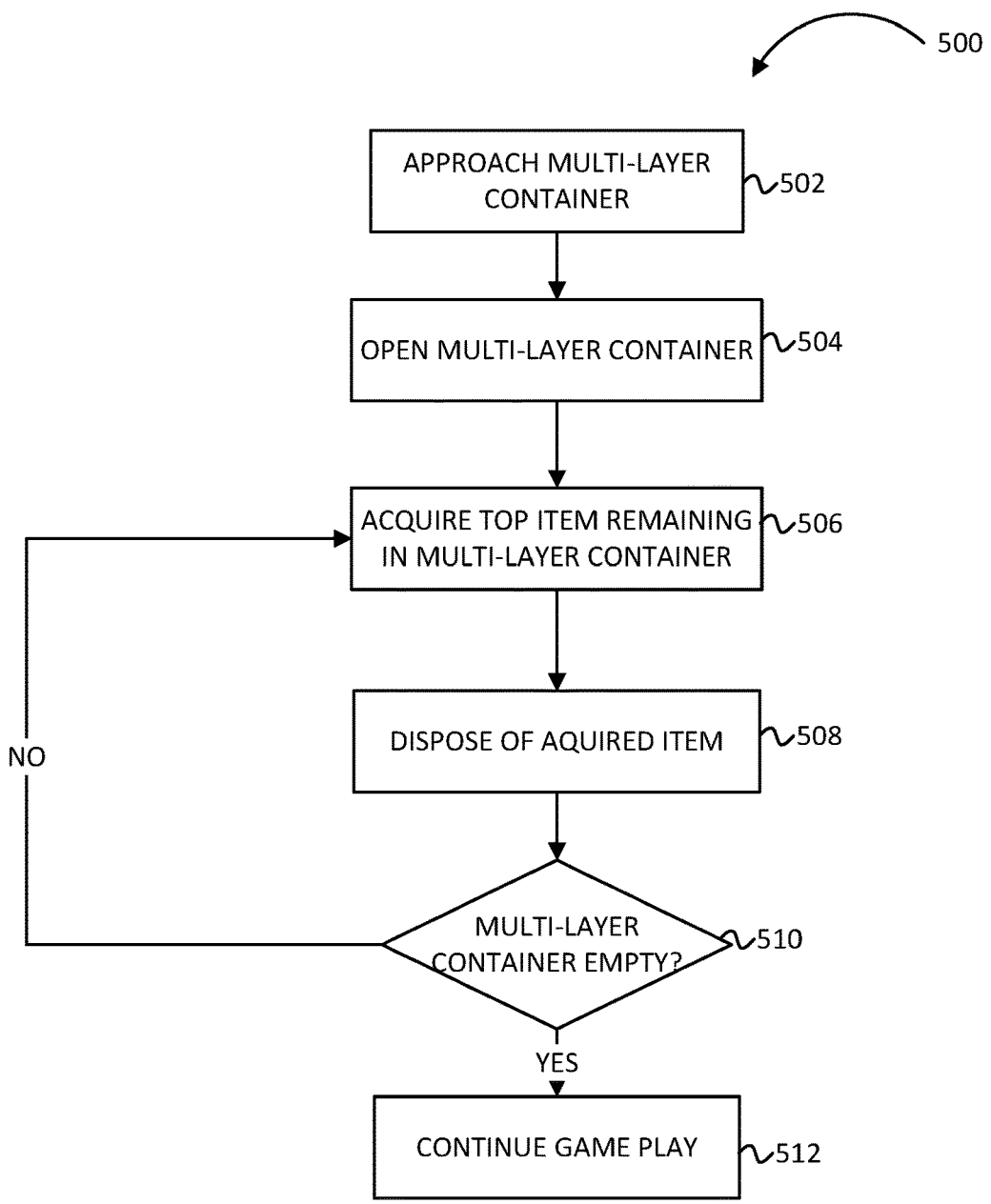
FIG. 5 illustrates an exemplary method for user interaction with a multi-layer container, in accordance with some embodiments.

FIG. 5 illustrates an exemplary method 500 for user interaction with a multi-layer container. Each of these operations is described in detail below. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting. In some embodiments, one or more portions of method 500 may be implemented (e.g., by simulation, modeling, etc.) in one or more processing devices (e.g., one or more processors). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500, for example. For illustrative purposes, optional operations are depicted with dashed lines. However, operations which are shown with unbroken lines can also be optional or can be omitted.

At an operation 502, a user approaches a multi-layer container. The multi-layer container may be blocking further play (such as blocking a path) or may be required by game play for the user to advance. The multi-layer container may be approached by a user's avatar, may be clicked on or otherwise selected by the user through an input device, etc.

At an operation 504, the user opens the multi-layer container. The multi-layer container may appear as a closed container (e.g., may have its contents concealed) before it is opened by the user. In some embodiments, the multi-layer container may be opened by a mechanism other than the user, such as by a timer. The multi-layer container may have a transparent lid, such that at least some contents are visible to the user before the container is opened. The multi-layer container may have a lid which displays a pixelated or otherwise obscured view of the contents within the container.

At an operation 506, the user acquires the top item remaining in the multi-layer container. The user may acquire the top item by clicking on or otherwise selecting the item from the multi-layer container, including by clicking through a dialog box, using a command, using a command button on a controller, etc. The top item may be added to the user's cache. The top item may appear in a representation of the user's hands, a representation of the user's avatar's hands, or in any other associated area which corresponds to user possession of the item.

The top items may be acquired by selecting the top item. The items which are not the top item may be visible but may not be acquired. The user may click on the top item and acquire it, but the items other than the top item may be unavailable to acquire. The items which are not the top item may be grayed out or otherwise indicated as unavailable. The items which are not the top item may appear available and the user may have to determine which items can be acquired by selecting various items. The item which are not the top item may appear obscured by items (including by the top item), by fill, etc.

At an operation 508, the user disposes of the acquired item. The disposition may include carrying the acquired item to another location, transferring the item to long term storage, selling the item, trading the item for another item of value (which may be a quantity of an in-game currency), etc. The user may dispose of the item immediately, or may perform other tasks before disposing of the item. The user may optionally place the item back into the multi-layer box to dispose of the item.

At an operation 510, it is determined if the multi-layer container is empty. If the multi-layer container is not empty, flow continues to the operation 506 where another item from the multi-layer box may be acquired. If the multi-layer container is empty, the container may be removed from the game play area. A visual representation of the container may disappear (such as in a puff of smoke), may move to a trash (e.g., recycling bin) area, may close (e.g., a trunk of a car may close when no items remain in it), etc.

At an operation 512, game play continues. The user may continue with other game play not involving the multi-layer container.

As described above, method 500 (and/or the other methods and systems described herein) is configured to provide a generic framework for user interaction with a multi-layer container.

Figure 6:
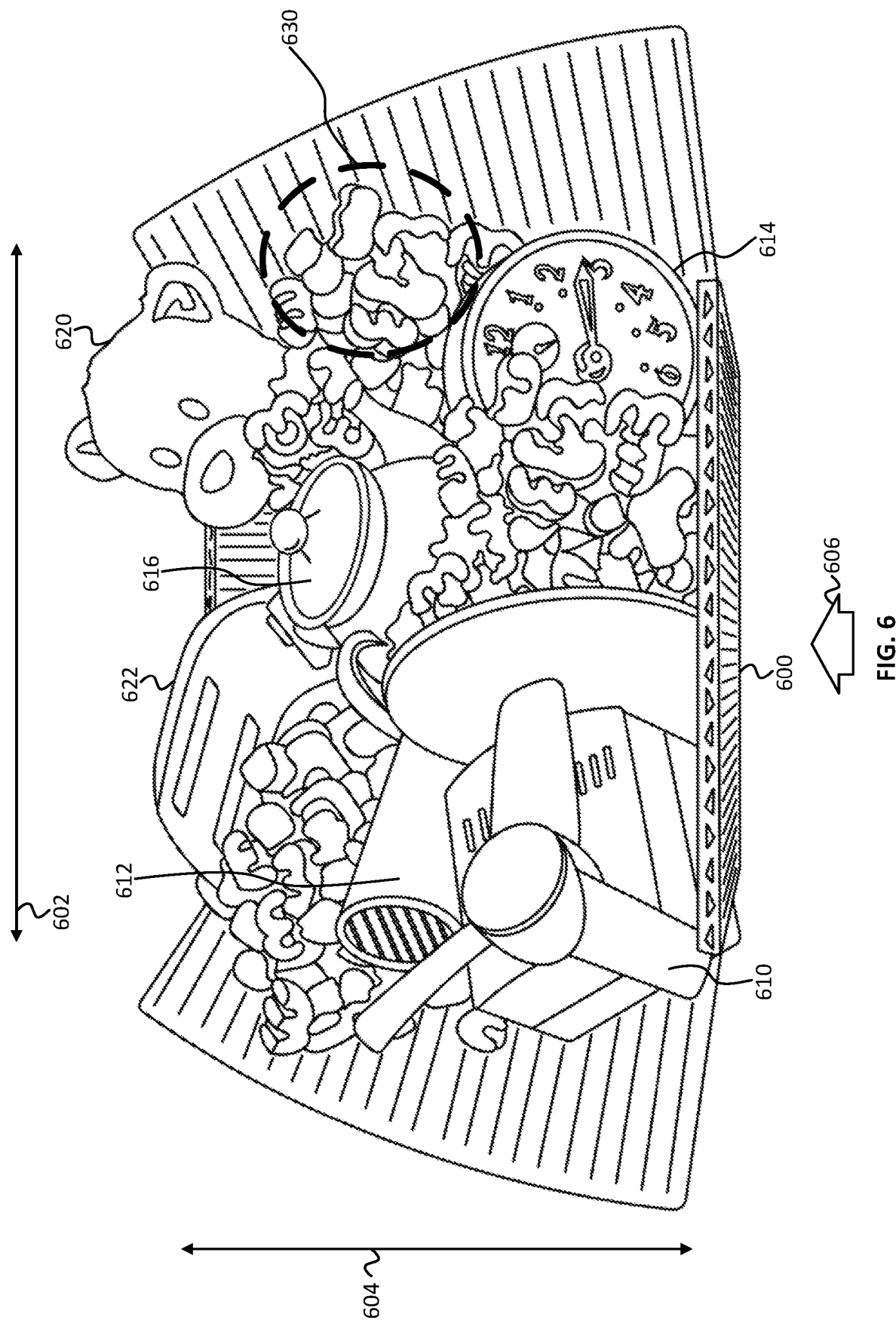
FIG. 6 depicts a multi-layer container, in accordance with some embodiments.

FIG. 6 depicts a multi-layer container 600. Multi-layer container 600 is intended to be illustrative, and the multi-layer container 600 type, size, etc., items within, and fill within may be changed without altering the operation of the multi-layer container 600.

The multi-layer container 600 spans multiple dimensions, depicted as an x-axis 602 and a y-axis 604. The multi-layer container 600 is depicted as a two-dimensional representation of a three-dimensional object, with a perspective one-point perspective from a view direction 606. Other dimensionality and perspectives may be used instead. The multi-layer container 600 is depicted as a cardboard box, but can instead have a different external shape, size, appearance, etc.

The multi-layer container 600 contains multiple items, including fan 610, hair dryer 612, clock 614, tea pot 616, toy bear 620, and toaster 622, as depicted. The multiple items have a relation relationship with one another out of the x-y plane. For example, the fan 610 obscures a portion of the hair dryer 612, which may be difficult for a user to identify in the current view. Additional items may be completely obscured. The multi-layer container 600 also container fill, such as that depicted within ellipse 630. In the current example, the fill corresponds to packing peanuts. The fill may be generated as individual pieces (e.g., individual packing peanuts), as a batch (for example, a group of packing peanuts), or as a single item. The fill may occupy slots in various layers of the multi-layer container, such that fill may obscure items within the multi-layer container.

Figure 7A:
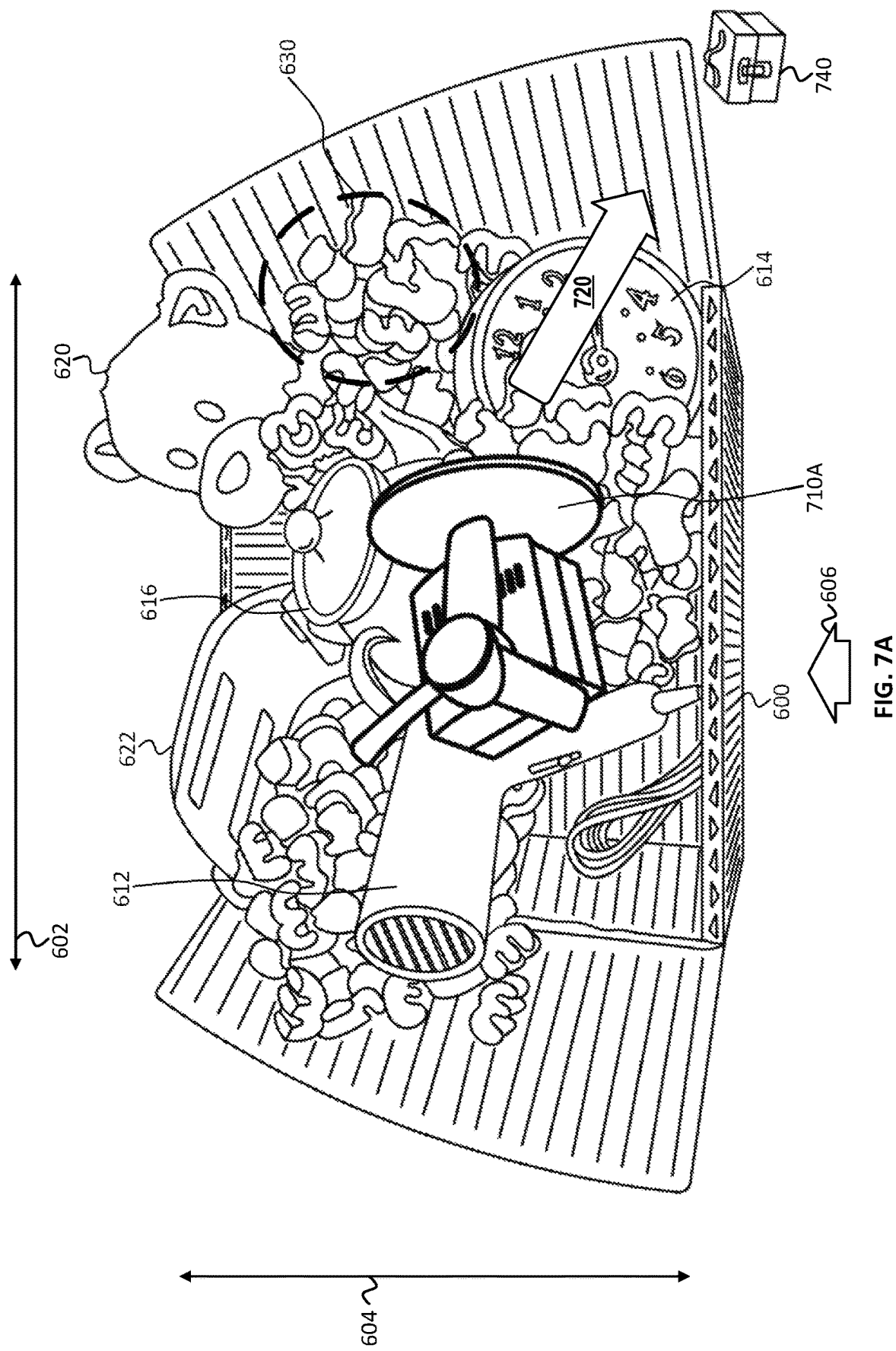
FIG. 7A depicts obtaining an object from a multi-layer container, in accordance with some embodiments.

FIG. 7A depicts obtaining an object from the multi-layer container 600. A top item of the multi-layer box (e.g., fan 610 of FIG. 6) has been selected by a user. The selection of the item (e.g., fan 610 of FIG. 6) may result in a visual change in appearance of the item, here depicted as a re-sizing to produce a fan 710B. The selection of the item may result in movement of the item, such as a predetermined shake, selection video graphic, etc. The selection of the item may result in movement of the item, such as in direction 720, from its unselected position to a cache, including towards a visual representation of a cache such as satchel 740.

Figure 7B:
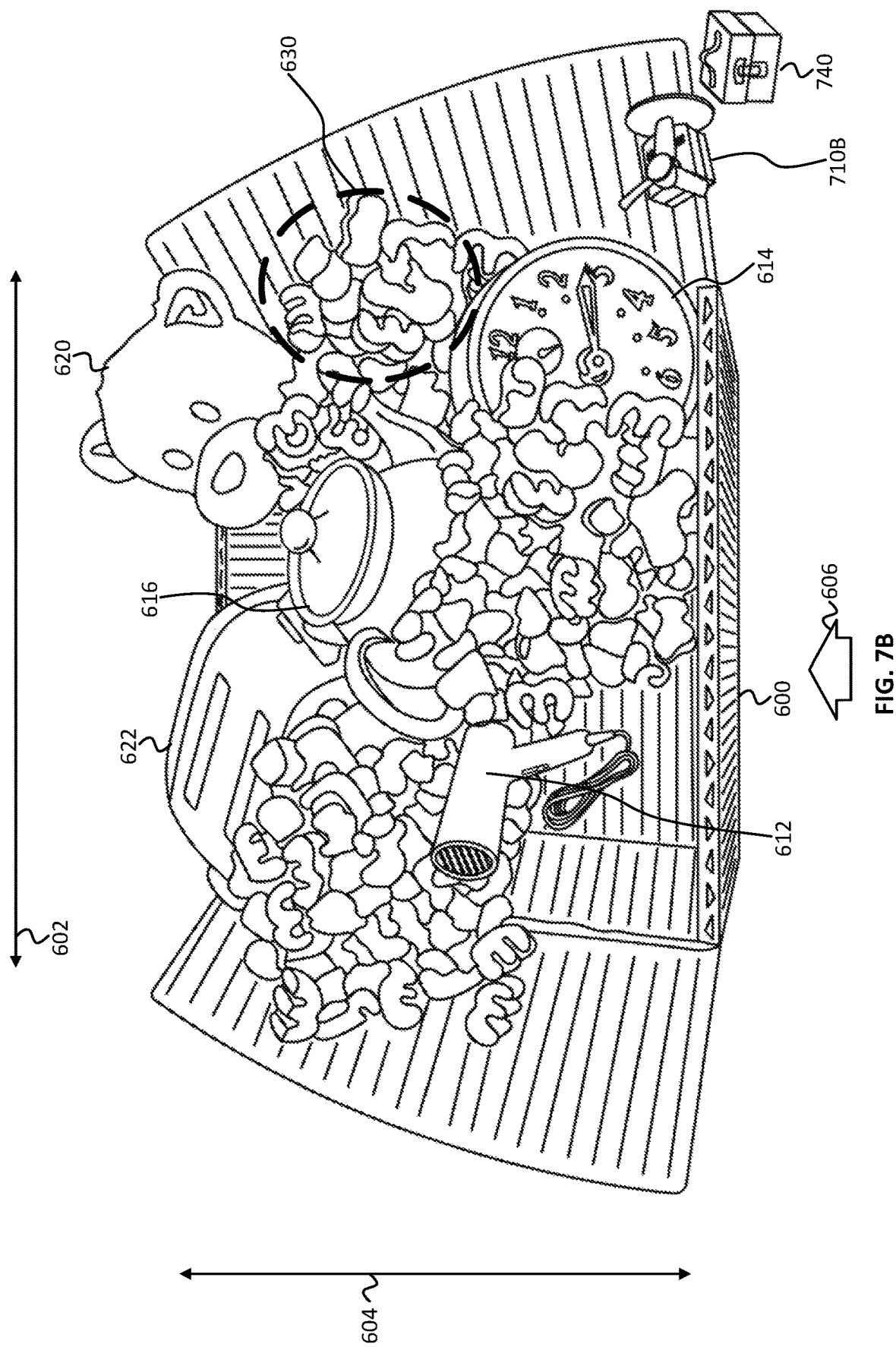
FIG. 7B further depicts obtaining an object from a multi-layer container, in accordance with some embodiments.

FIG. 7B further depicts obtaining an object from the multi-layer container 600. The top item of the box (e.g., fan 610 of FIG. 6, fan 710A of FIG. 7A) has been selected by a user (as depicted in FIG. 7A) and is approaching satchel 740 for acquisition by the user as shown by the placement of fan 710B. The other objects in the box, which were previously under the selected item are now more visible instead of obscured by the selected item. For example, hair dryer 612 is identifiable where it was previously obscured by fan 610 in FIG. 6. Items in the fill which were obscured by the fan 610 in FIG. 6 have also been revealed.

A selected item may experience one or more visual transformation after being selected. For example, the item may change in size and move about the graphical representation of the multi-layer container. In FIGS. 7A-7B, fan 710A and fan 710B depict a movement from the location of fan 60 of FIG. 6 across the x-axis 602 into satchel 740. However, the selected object may move about the visual depiction in a nonlinear manner, rotate about the screen, disappear, disappear with an animation, display an animate sequence, etc.

Figure 8A:
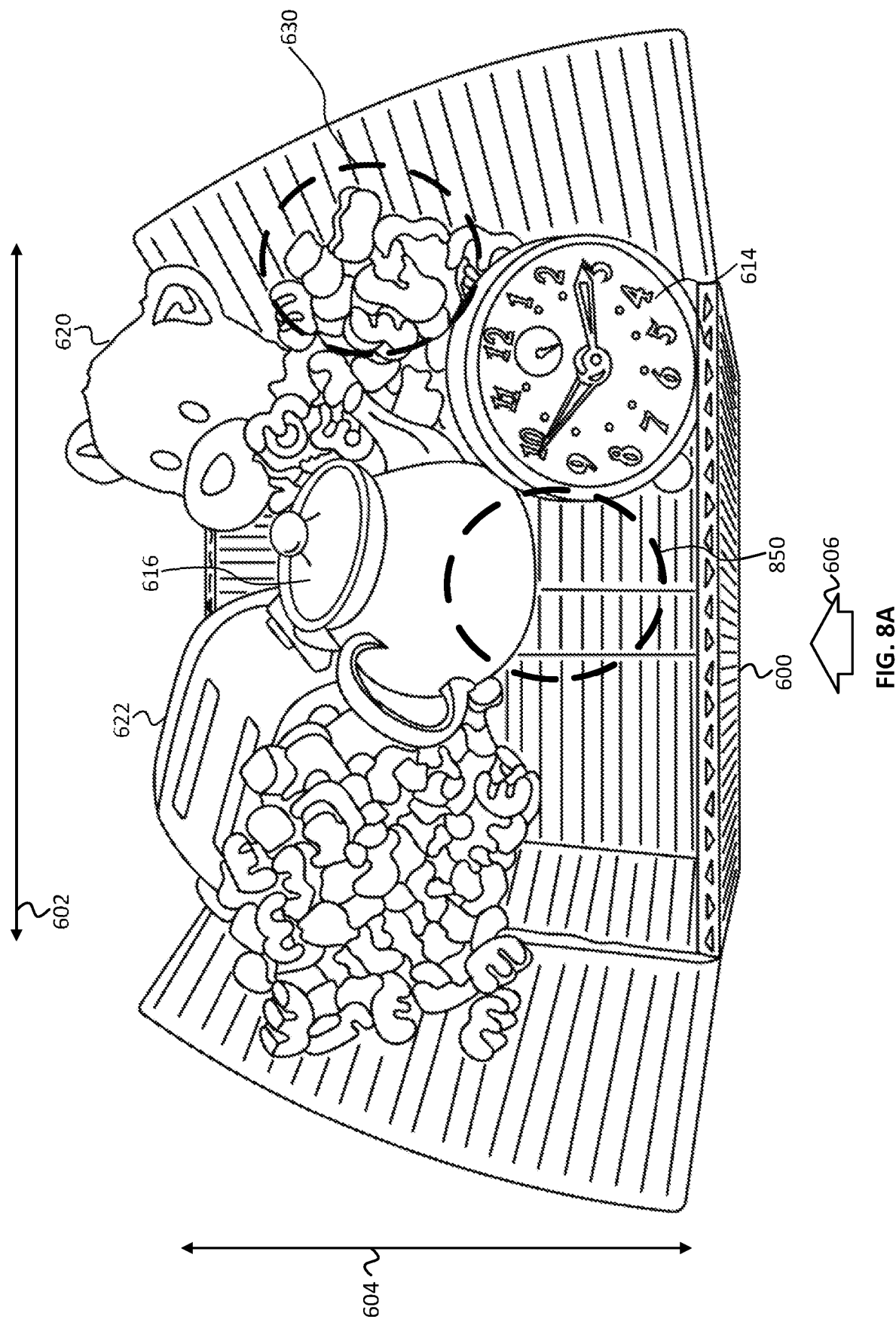
FIG. 8A depicts a multi-layer container from which objects have been obtained, in accordance with some embodiments.

FIG. 8A depicts the multi-layer container 600 from which objects have been obtained. The multi-layer container 600 is depicted after multiple objects have been removed (e.g., acquired by a user). Fan 610 and hair dryer 612 of FIG. 6 have been removed. Fill has also been removed, as shown by ellipse 850 which corresponds to an area of the multi-layer container 600 previous containing fill. Clock 614 may be a topmost item in the multi-layer container 600 in this depiction. It is also possible that fill in front of toaster 622 is a topmost item in the multi-layer container 600. A user may determine which item is topmost by clicking in the multi-layer container 600 depiction. Fill, such as that in front of toaster 622, may be removed by clicking with a cursor, by hovering with a cursor, automatically if a user clicks another topmost item (e.g., fill in front of the toaster 622 may disappear if a user selects clock 614), etc. Clock 614 and tea pot 616 may be in substantially the same layer, or may be in different layers. A user may attempt to determine which object is topmost based on a behavior in response to item selection.

Figure 8B:
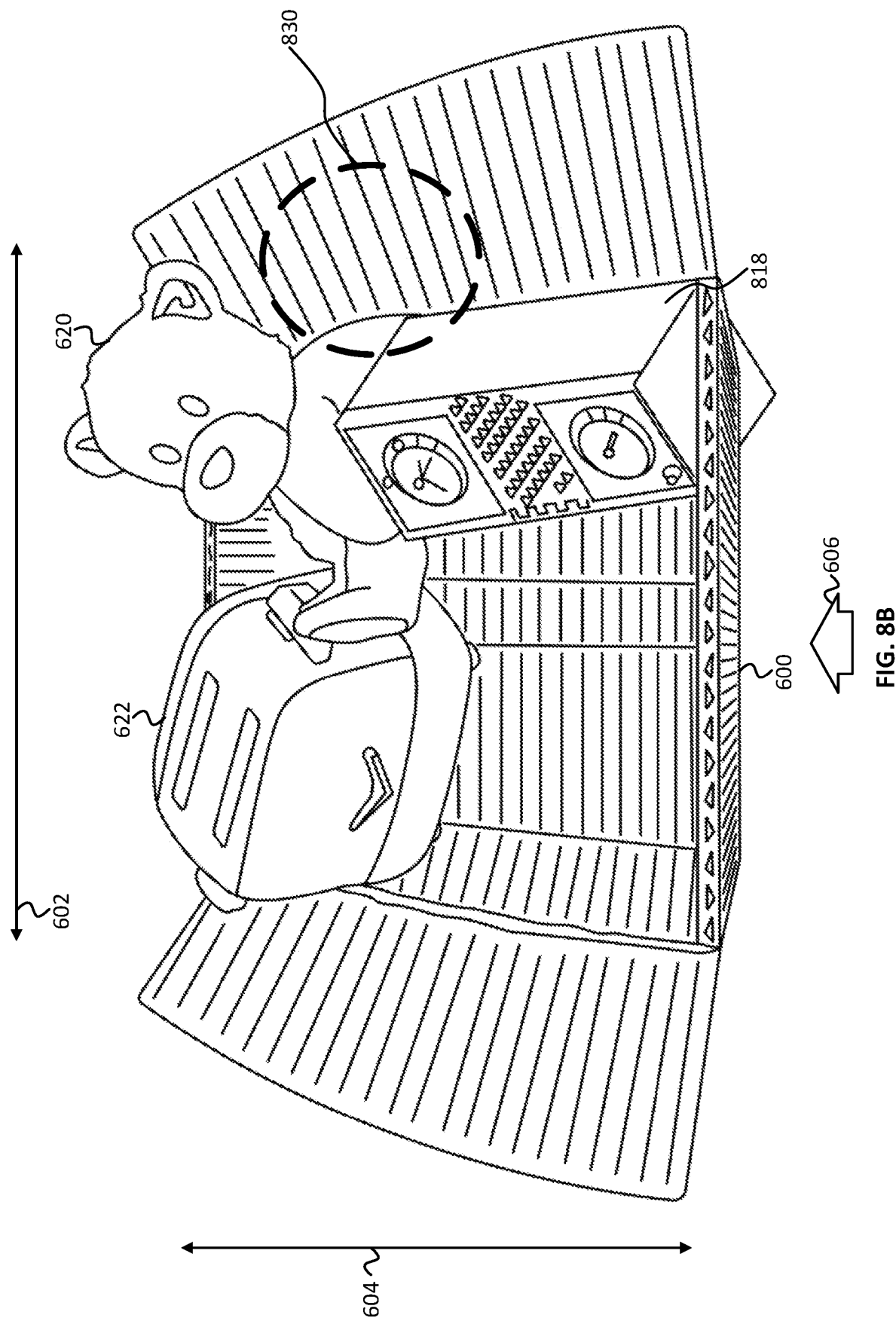
FIG. 8B further depicts a multi-layer container from which objects have been obtained, in accordance with some embodiments.

FIG. 8B further depicts the multi-layer container 600 from which additional objects have been obtained. The multi-layer container 600 is depicted after additional objects have been removed, relative to FIG. 8A. Items which have been removed include clock 614, tea pot 616, and multiple instances of fill. Removal of fill, including fill which previously occupied an area identified by ellipse 830, and items has revealed additional items in the multi-layer container 600—specifically radio 818. Radio 818 was previously hidden by fill and clock 614 and is now visible and partially obscured toy bear 620. A user may be surprised by items which are revealed as other items and fill are removed from the multi-layer container 600.

Figure 9:
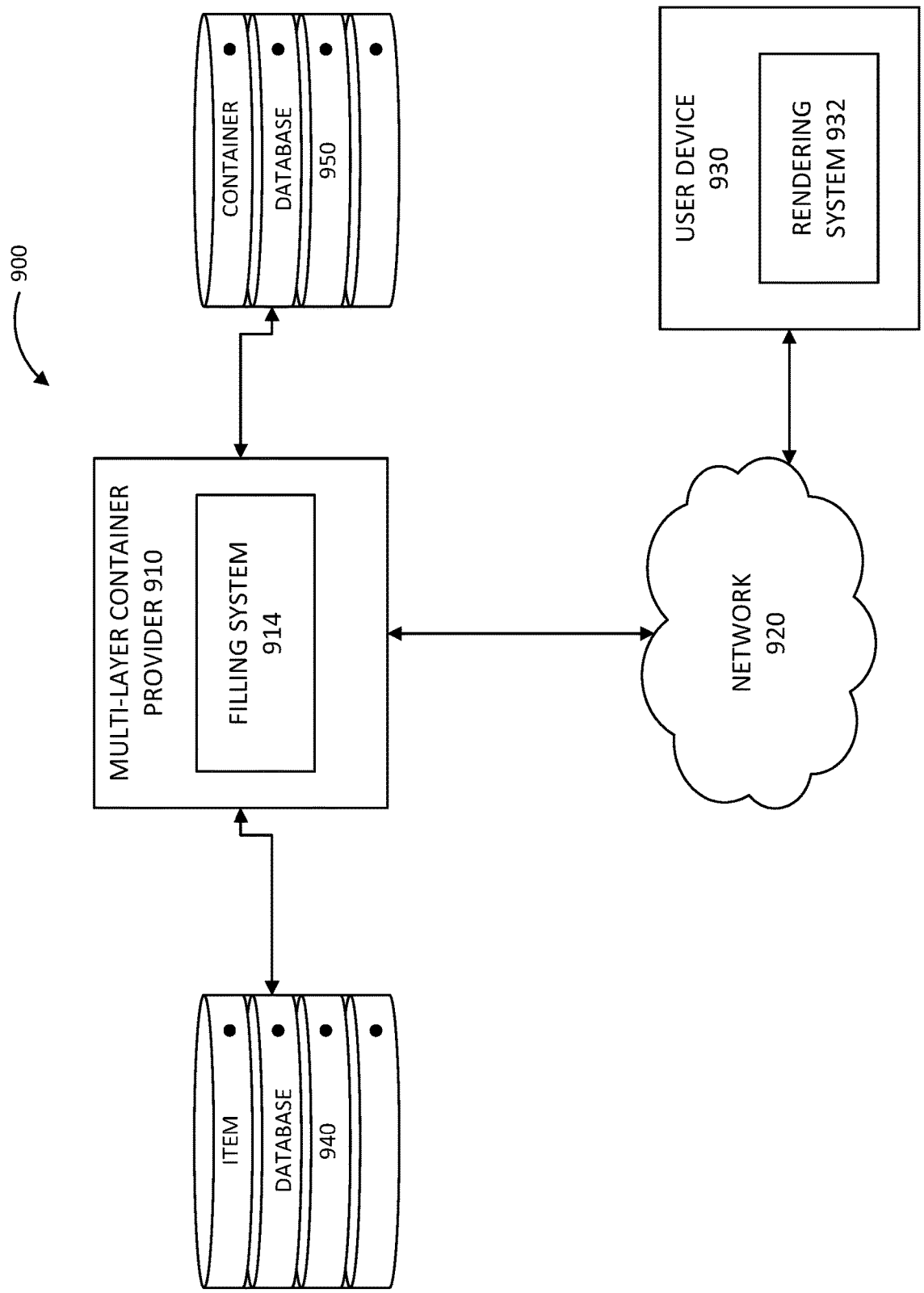
FIG. 9 shows an example computing system that generation of a multi-layer container, in accordance with some embodiments.

FIG. 9 shows an example computing system 900 that implements multi-layer container, in accordance with some embodiments. The computing system 900 may include a multi-layer container provider 910, a user interface 930, an item database 940 and, a container database 950. The multi-layer container provider 910 may include a filling system 914. The filling system 914 may retrieve items from the item database 940 or containers from the container database 950 for use in providing the multi-layer container by the multi-layer container provider 910. The item database 940 and the container database 950 may be a unified database or comprised of multiple data storage units.

The user interface 930 was include a rendering system 932. The rendering system 932 may render the multi-layer container at various levels of fill, including rendering animation of item acquisition. The rendering system 932 may operate within a game providing system on the user interface 930. The user interface 930 may be a variety of different types of computing devices, including, but not limited to (which is not to suggest that other lists are limiting), a laptop computer, a tablet computer, a hand-held computer, smartphone, other computer equipment (e.g., a server or virtual server), including "smart," wireless, wearable, Internet of Things device, or mobile devices. The user interface 930 may send commands to the multi-layer container provider 910 (e.g., to provide a container, to render a container, to alter a rendering of a container after an item has been acquired, etc.). Although only one instance of user interface 930 is shown, the system 900 may include any number of client devices.

The multi-layer container provider 910 may include one or more computing devices described above and may include any type of mobile terminal, fixed terminal, or other device. For example, the multi-layer container provider 910 may be implemented as a cloud computing system and may feature one or more component devices. The multi-layer container provider 910 may be part of a provider of game play or a provider of other elements of game play, such as a graphics provider. Users may, for example, utilize one or more other devices to interact with devices, one or more servers, or other components of system 900. In some embodiments, operations described herein as being performed by particular components of the system 900, may be performed by other components of the system 900 (which is not to suggest that other features are not also amenable to variation). As an example, while one or more operations are described herein as being performed by components of the multi-layer container provider 910, those operations may be performed by components of the user interface 930, item database 940 or container database 950. In some embodiments, the various computers and systems described herein may include one or more computing devices that are programmed to perform the described functions. In some embodiments, multiple users may interact with system 900. For example, a first user and a second user may interact with the multi-layer container provider 910 using two different user devices.

One or more components of the multi-layer container provider 910, user interface 930, item database 940, and container database 950, may receive content and other data via input/output (hereinafter "I/O") paths. The one or more components of the multi-layer container provider 910, user interface 930, the item database 940 and/or the container database 950 may include processors and/or control circuitry to send and receive commands, requests, and other suitable data using the I/O paths. The control circuitry may include any suitable processing, storage, and/or input/output circuitry. Each of these devices may include a user input interface and/or user output interface (e.g., a display) for use in receiving and displaying data. It should be noted that in some embodiments, the multi-layer container provider 910, the user interface 930, the item database 940 and the container database 950 may have neither user input interface nor displays and may instead receive and display content using another device (e.g., a dedicated display device such as a computer screen and/or a dedicated input device such as a remote control, mouse, voice input, etc.). Additionally, the devices in system 900 may run an application (or another suitable program). The application may cause the processors and other control circuitry to perform operations related to weighting training data (e.g., to increase the efficiency of training and performance of one or more machine-learning models described herein).

One or more components or devices in the system 900 may include electronic storages. The electronic storages may include non-transitory storage media that electronically stores information. The electronic storage media of the electronic storages may include one or both of (a) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), or other electronically, magnetically, or optically readable storage media. The electronic storages may include one or more virtual storage resources (e.g., cloud storage, a virtual private network, or other virtual storage resources). The electronic storages may store software algorithms, information determined by the processors, information obtained from servers, information obtained from client devices, or other information that enables the functionality as described herein.

FIG. 9 also includes a network 920. The network 920 may be the Internet, a mobile phone network, a mobile voice or data network (e.g., a 5G or LTE network), a cable network, a public switched telephone network, a combination of these networks, or other types of communications networks or combinations of communications networks. The devices in FIG. 9 (e.g., multi-layer container provider 910, the user interface 930, the item database 940 and/or the container database 950) may communicate (e.g., with each other or other computing systems not shown in FIG. 1) via the network 920 using one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The devices in FIG. 9 may include additional communication paths linking hardware, software, and/or firmware components operating together. For example, the multi-layer container provider 910, any component of the multi-layer container provider 910 (e.g., the filling system 914), the user interface 930, any component of the user interface (e.g., the rendering system 932), the item database 940 and/or the container database 950 may be implemented by one or more computing platforms.

It should be emphasized that, while some embodiments find use in the context of games, the present techniques are not directed to rules for conducting a game or other economic practices or methods of organizing human activity. The innovations in human computer interaction described, in some embodiments, improve the efficiency of using the electronic devices at hand and are implemented with specific rules with specific characteristics that manage occlusion of a stack of graphical assets in a z-buffer. The rules of the game itself implementing this technique are not the subject matter to which the present application is directed, and the present techniques may be used in a variety of different types of games, regardless of the rules of those games. Indeed, the present techniques are also contemplated for other non-game use cases, where, for example, a user navigates through a container of items in a training exercise, in which information is revealed in a staged fashion, upon the user satisfying various tests of mastery, in order to improve retention of the information presented and manage the cognitive load applied by the user interface.

Figure 10:
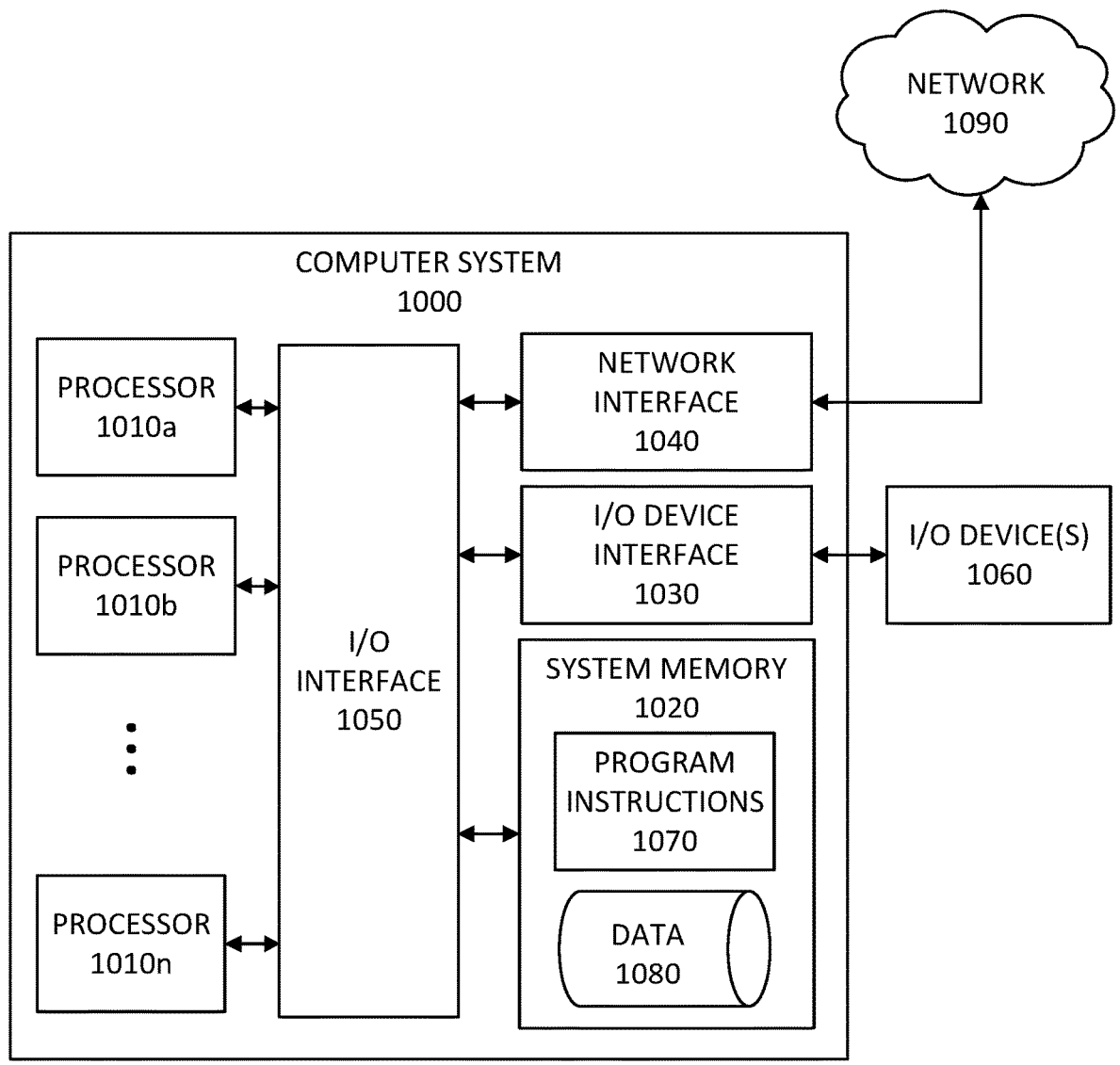
FIG. 10 shows an example computing device that may be used to implement some embodiments.

FIG. 10 shows an example computing system 1000 that may be used to implement some embodiments. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a units-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computing system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computing system 1000 through a wired or wireless connection. I/O devices 1060 may be connected to computing system 1000 from a remote location. I/O devices 1060 located on remote computer system, for example, may be connected to computing system 1000 via a network 1090 and network interface 1040.

Network interface 1040 may include a network adapter that provides for connection of computing system 1000 to a network. Network interface 1040 may facilitate data exchange between computing system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1070 or data 1080. Program instructions 1070 may be executable by a processor (e.g., one or more of processors 1010a-1010n) to implement one or more embodiments of the present techniques. Program instructions 1070 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computing system 1000 is merely illustrative and is not intended to limit the scope of the techniques described herein. Computing system 1000 may include any combination of devices or software that may perform or otherwise provide for the performance of the techniques described herein. For example, computing system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1000 may be transmitted to computing system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

The present techniques will be better understood when read in view of the following enumerated embodiments:

1. A tangible, non-transitory, machine-readable medium storing instructions that when executed by one or more processors effectuate operations comprising: determining, with a computer system, to display a multi-layer container to a user in a game; configuring, with the computer system, the multi-layer container by: selecting a plurality of items for game play from a set of candidate items supported by the game; selecting a type of container from a set of candidate containers supported by the game; and determining positions of each of the plurality of items in three dimensions, two of which being in pixel space and one being in a z-buffer space, wherein, in the determined positions, at least some of the plurality of items are to be partially occluded by other items closer to the user in z-buffer space when displayed; displaying, with the computer system, the configured multi-layer container to the user; receiving, with the computer system, a user input selecting a top item of the plurality of items and, in response, determining whether a score of the user satisfies a first threshold, the score demoting capacity of the user to remove items from the container; and in response to the user input and determining the score of the user satisfies the first threshold, displaying, with the computer system, the multi-layer container to the user with the top item of the plurality of items removed from the multi-layer container and adjusting the score to indicate capacity to remove items from the container has diminished.

2. The medium of embodiment 1, wherein determining positions of each of the plurality of items in three dimensions comprises: accessing positions in pixel space specified for slots associated with configuring the multi-layer container before determining to display the multi-layer container.

3. The medium of embodiment 1, wherein determining positions of each of the plurality of items in three dimensions comprises: determining slot positions by convolving two-dimensional bitmaps of at least some of the items to compute an occlusion metric at a variety of positions and selecting a position among the variety of positions according a maximal or minimal value of the occlusion metric relative to others of the variety of positions.

4. The medium of embodiment 1, further comprising: determining the positions in pixel space according to a greedy optimization of an occlusion metric at each of a plurality of layers of the z-buffer space.

5. The medium of embodiment 1, wherein: the operations comprise: in response to the user input, adding the top item of the plurality of items for game play to a user storage area; in response to an additional user input, displaying, with the computer system, the multi-layer container to the user, wherein an additional top item of the plurality of items for game play has been removed from the multi-layer container; and in response to the additional user input, adding the additional top item of the plurality of items for game play to a user storage area; and the user storage area stores a second threshold number of items.

6. The medium of embodiment 5, wherein in response to an additional user input, displaying, with the computer system, the multi-layer container to the user, wherein an additional top item of the plurality of items for game play has been removed from the multi-layer container comprises: determining if the number of items in the storage area is or exceeds the second threshold number of items; and based on a determination that the number of items in the storage area is or exceeds the second threshold number of items, displaying, with the computer system, the multi-layer container to the user, wherein the additional top item of the plurality of items for game play has not been removed from the multi-layer container.

7. The medium of embodiment 6, wherein in in response to the additional user input, adding the additional top item of the plurality of items for game play to a user storage area comprises: determining if the number of items in the storage area is or exceeds the second threshold number of items; and based on a determination that the number of items in the storage area is or exceeds the second threshold number of items, in response to the additional user input, not adding the additional top item of the plurality of items for game play to a user storage area.

8. The medium of embodiment 1, further comprising: in response to a plurality of user input, displaying, with the computer system, an empty multi-layer container to the user.

9. The medium of embodiment 8, wherein the multi-layer container prevents a user from performing at least a set of aspects of the game and wherein the empty multi-layer container does not prevent the user from performing the set of aspects of the game.

10. The medium of embodiment 1, wherein displaying the multi-layer container to a user comprises: obtaining a container; obtaining layers of the container; obtaining a plurality of slots for items in a plurality of the layers; obtaining a plurality of items for game play; inserting items of the plurality of items for game play into slots of the plurality of slots; and causing the container and the plurality of items for game play in the slots in the plurality of layers to be rendered as a multi-layer container.

11. The medium of embodiment 10, wherein obtaining a plurality of items for game play comprises obtaining a mask for each of the plurality of items for game play.

12. The medium of embodiment 11, wherein user input comprises an interaction between the user and the mask of the top item of the plurality of items for game play.

13. The medium of embodiment 10, wherein obtaining a plurality of items for game play further comprising: selecting an item of the plurality of items; and based on a graphical property of the item, generating a mask for the item.

14. The medium of embodiment 1, comprising means for displaying the multi-layer container to the user.

15. The medium of embodiment 1, further comprising: in response to the user input, removing an amount of currency corresponding to a cost of the top item of the plurality of items for game play from an account of the user.

16. The medium of embodiment 15, wherein displaying, with the computer system, the multi-layer container to a user further comprises displaying at least the cost of the top item of the plurality of items for game play to the user.

17. The medium of embodiment 15, wherein an amount of currency corresponds to a value of the top item of the plurality of items for game play.

18. The medium of embodiment 17, the cost of the top item of the plurality of items is in a first currency and where the value of the top item of the plurality of items is in a different currency.

19. The medium of embodiment 1, further comprising means for converting the top item of the plurality of items into an in-game currency.

20. A method comprising: determining, with a computer system, to display a multi-layer container to a user in a game; configuring, with the computer system, the multi-layer container by: selecting a plurality of items for game play from a set of candidate items supported by the game; selecting a type of container from a set of candidate containers supported by the game; and determining positions of each of the plurality of items in three dimensions, two of which being in pixel space and one being in a z-buffer space, wherein, in the determined positions, at least some of the plurality of items are to be partially occluded by other items closer to the user in z-buffer space when displayed; displaying, with the computer system, the configured multi-layer container to the user; receiving, with the computer system, a user input selecting a top item of the plurality of items and, in response, determining whether a score of the user satisfies a first threshold, the score demoting capacity of the user to remove items from the container; and in response to the user input and determining the score of the user satisfies the first threshold, displaying, with the computer system, the multi-layer container to the user with the top item of the plurality of items removed from the multi-layer container and adjusting the score to indicate capacity to remove items from the container has diminished.

What is claimed is:

1. A tangible, non-transitory, machine-readable medium storing instructions that when executed by one or more processors effectuate operations comprising:
   determining, with a computer system, to display a multi-layer container to a user in a game;
   configuring, with the computer system, the multi-layer container by:
     selecting a plurality of items for game play from a set of candidate items supported by the game;
     selecting a type of container from a set of candidate containers supported by the game; and
     determining positions of each of the plurality of items in three dimensions, two of which being in pixel space and one being in a z-buffer space, wherein, in the determined positions, at least some of the plurality of items are to be partially occluded by other items closer to the user in z-buffer space when displayed;
   displaying, with the computer system, the configured multi-layer container to the user;
   receiving, with the computer system, a user input selecting a top item of the plurality of items and, in response, determining whether a score of the user satisfies a first threshold, wherein the score denotes capacity of the user to remove items from the container; and in response to the user input and determining the score of the user satisfies the first threshold, displaying, with the computer system, the multi-layer container to the user with the top item of the plurality of items removed from the multi-layer container and adjusting the score to indicate capacity to remove items from the container has diminished.

2. The medium of claim 1, wherein determining positions of each of the plurality of items in three dimensions comprises:

accessing positions in pixel space specified for slots associated with configuring the multi-layer container before determining to display the multi-layer container.

3. The medium of claim 1, wherein determining positions of each of the plurality of items in three dimensions comprises:

determining slot positions by convolving two-dimensional bitmaps of at least some of the items to compute an occlusion metric at a variety of positions and selecting a position among the variety of positions according a maximal or minimal value of the occlusion metric relative to others of the variety of positions.

4. The medium of claim 1, further comprising:
determining the positions in pixel space according to a greedy optimization of an occlusion metric at each of a plurality of layers of the z-buffer space.

5. The medium of claim 1, wherein:
the operations comprise:
in response to the user input, adding the top item of the plurality of items for game play to a user storage area;
in response to an additional user input, displaying, with the computer system, the multi-layer container to the user, wherein an additional top item of the plurality of items for game play has been removed from the multi-layer container; and
in response to the additional user input, adding the additional top item of the plurality of items for game play to the user storage area; and
the user storage area stores a second threshold number of items.

6. The medium of claim 5, wherein in response to an additional user input, displaying, with the computer system, the multi-layer container to the user, wherein an additional top item of the plurality of items for game play has been removed from the multi-layer container comprises:

determining if the number of items in the storage area is or exceeds the second threshold number of items; and
based on a determination that the number of items in the storage area is or exceeds the second threshold number of items, displaying, with the computer system, the multi-layer container to the user, wherein the additional top item of the plurality of items for game play has not been removed from the multi-layer container.

7. The medium of claim 6, wherein in in response to the additional user input, adding the additional top item of the plurality of items for game play to a user storage area comprises:

determining if the number of items in the storage area is or exceeds the second threshold number of items; and
based on a determination that the number of items in the storage area is or exceeds the second threshold number of items, in response to the additional user input, not adding the additional top item of the plurality of items for game play to a user storage area.

8. The medium of claim 1, further comprising:
in response to a plurality of user input, displaying, with the computer system, an empty multi-layer container to the user.

9. The medium of claim 8, wherein the multi-layer container prevents a user from performing at least a set of aspects of the game and wherein the empty multi-layer container does not prevent the user from performing the set of aspects of the game.

10. The medium of claim 1, wherein displaying the multi-layer container to a user comprises:
obtaining a container;
obtaining layers of the container;
obtaining a plurality of slots for items in a plurality of the layers;
obtaining a plurality of items for game play;
inserting items of the plurality of items for game play into slots of the plurality of slots; and
causing the container and the plurality of items for game play in the slots in the plurality of layers to be rendered as a multi-layer container.

11. The medium of claim 10, wherein obtaining a plurality of items for game play comprises obtaining a mask for each of the plurality of items for game play.

12. The medium of claim 11, wherein user input comprises an interaction between the user and the mask of the top item of the plurality of items for game play.

13. The medium of claim 10, wherein obtaining a plurality of items for game play further comprising:
selecting an item of the plurality of items; and
based on a graphical property of the item, generating a mask for the item.

14. The medium of claim 1, wherein the operations comprise steps for generating the multi-layer container.

15. The medium of claim 1, further comprising:
in response to the user input, removing an amount of currency corresponding to a cost of the top item of the plurality of items for game play from an account of the user.

16. The medium of claim 15, wherein displaying, with the computer system, the multi-layer container to a user further comprises displaying at least the cost of the top item of the plurality of items for game play to the user.

17. The medium of claim 15, wherein an amount of currency corresponds to a value of the top item of the plurality of items for game play.

18. The medium of claim 17, the cost of the top item of the plurality of items is in a first currency and where the value of the top item of the plurality of items is in a different currency.

19. The medium of claim 1, wherein the operations comprise steps for populating the multi-layer container.

20. A method comprising:
determining, with a computer system, to display a multi-layer container to a user in a game;
configuring, with the computer system, the multi-layer container by:
selecting a plurality of items for game play from a set of candidate items supported by the game;
selecting a type of container from a set of candidate containers supported by the game; and
determining positions of each of the plurality of items in three dimensions, two of which being in pixel space and one being in a z-buffer space, wherein, in the determined positions, at least some of the plurality of items are to be partially occluded by other items closer to the user in z-buffer space when displayed;

displaying, with the computer system, the configured multi-layer container to the user;

receiving, with the computer system, a user input selecting a top item of the plurality of items and, in response, determining whether a score of the user satisfies a first threshold, wherein the score denotes capacity of the user to remove items from the container; and in response to the user input and determining the score of the user satisfies the first threshold, displaying, with the computer system, the multi-layer container to the user with the top item of the plurality of items removed from the multi-layer container and adjusting the score to indicate capacity to remove items from the container has diminished.

* * * * *